(12) United States Patent
Wang et al.

(10) Patent No.: US 11,784,885 B2
(45) Date of Patent: Oct. 10, 2023

(54) SHARED BANDWIDTH SPEED LIMITING METHOD, DEVICE, AND STORAGE MEDIUM

(71) Applicant: LightWAN Corporation Limited, Hong Kong (CN)

(72) Inventors: Yongdong Wang, Hong Kong (CN); Yunpeng Chen, Hong Kong (CN); Guibin Hua, Wan Chai (HK); Zhenli Cao, Wan Chai (HK)

(73) Assignee: LightWAN Corporation Limited, Hong Kong (CN)

( * ) Notice: Subject to any disclaimer, the term of this patent is extended or adjusted under 35 U.S.C. 154(b) by 0 days.

(21) Appl. No.: 17/372,870

(22) Filed: Jul. 12, 2021

(65) Prior Publication Data
US 2022/0014438 A1    Jan. 13, 2022

(30) Foreign Application Priority Data

Jul. 13, 2020  (CN) .......................... 202010669317.X (51) Int. Cl.
*H04L 41/0896* (2022.01)
*H04L 47/215* (2022.01)

(52) U.S. Cl.
CPC ........ *H04L 41/0896* (2013.01); *H04L 47/215* (2013.01)

(58) Field of Classification Search
None
See application file for complete search history.

(56) References Cited

U.S. PATENT DOCUMENTS

| 6,868,062 B1 * | 3/2005 | Yadav | .................. H04L 47/125 370/231 |
| 7,327,682 B2 * | 2/2008 | Gandhi | ................. H04L 47/215 370/233 |

(Continued)

FOREIGN PATENT DOCUMENTS

| CN | 101827398 A | 9/2010 |
| CN | 102118269 A | 7/2011 |

(Continued)

*Primary Examiner* — Khaled M Kassim
*Assistant Examiner* — Berhanu D Belete
(74) *Attorney, Agent, or Firm* — Occhiuti & Rohlicek LLP (57) ABSTRACT

The present disclosure relates to the field of communication technologies, in particular to a shared bandwidth speed-limiting method, device, and storage medium. The method for customer premise equipment comprises: adding a token into a token bucket of the customer premise equipment based on an initial bandwidth rate; and sending a statistical information report to a central controller every preset time interval, wherein the statistical information report represents a report reflecting a surplus or deficiency condition of tokens in the token bucket, and is configured to instruct the central controller to reallocate tokens of the customer premise equipment by a central token bucket. In embodiments, a token bucket algorithm is introduced to a distributed environment with a central controller, so that at least two pieces of customer premise equipment in distributed apparatuses can share a speed-limiting bandwidth, providing more flexible bandwidth subscription options and further improving the utilization of bandwidth resources.

8 Claims, 3 Drawing Sheets

(56) References Cited

U.S. PATENT DOCUMENTS

| | | | |
|---|---|---|---|
| 8,315,168 B2* | 11/2012 | Davari | H04L 47/10 370/235 |
| 9,262,505 B2* | 2/2016 | Yanacek | G06F 16/21 |
| 9,917,782 B2* | 3/2018 | Xiao | H04L 47/70 |
| 10,419,965 B1* | 9/2019 | Kadosh | H04L 47/823 |
| 10,560,395 B2* | 2/2020 | Li | H04L 12/6418 |
| 2004/0037306 A1 | 2/2004 | Khan et al. | |
| 2004/0100967 A1* | 5/2004 | Robotham | H04L 47/41 370/412 |
| 2007/0195872 A1* | 8/2007 | Diaz | H04B 17/26 375/222 |
| 2008/0191816 A1* | 8/2008 | Balachandran | H04L 47/19 333/24 R |
| 2008/0225725 A1* | 9/2008 | Wang | H04W 48/16 370/235.1 |
| 2011/0075562 A1* | 3/2011 | Isaksson | H04L 47/527 370/235.1 |
| 2011/0096666 A1* | 4/2011 | Davari | H04L 47/215 370/235 |
| 2014/0297726 A1* | 10/2014 | Balachandran | H04N 21/2402 709/203 |
| 2015/0071076 A1* | 3/2015 | Izhak-Ratzin | H04L 47/2408 370/236 |
| 2015/0230163 A1* | 8/2015 | Wang | H04W 48/10 455/434 |
| 2020/0028788 A1 | 1/2020 | Chen et al. | |
| 2021/0133735 A1* | 5/2021 | Maim | G06Q 20/06 |

FOREIGN PATENT DOCUMENTS

| | | |
|---|---|---|
| CN | 104734989 A | 6/2015 |
| CN | 107347198 A | 11/2017 |
| CN | 108418766 A | 8/2018 |

\* cited by examiner

SHARED BANDWIDTH SPEED LIMITING METHOD, DEVICE, AND STORAGE MEDIUM

CROSS-REFERENCE TO RELATED APPLICATIONS

The present disclosure claims priority to Chinese Patent Application entitled "SHARED BANDWIDTH SPEED-LIMITING METHOD, DEVICE, AND STORAGE MEDIUM" filed with the CNIPA on Jul. 13, 2020, with the Application No. 202010669317.X, the entire contents of which are incorporated herein by reference.

TECHNICAL FIELD

The present disclosure relates to the field of communication technologies, in particular to a shared bandwidth speed-limiting method, device, and storage medium.

BACKGROUND

A bandwidth speed-limiting method may refer to a method by which a network service provider limits a network bandwidth available to user equipment when providing network services.

Traditional firewall equipment can independently make either a speed limit for one Internet Protocol (IP) address or a shared speed limit for multiple IP addresses at the same network outlet.

However, it is impossible to implement a shared speed limit for IP addresses at different network outlets in different regions. Related technologies have not yet provided a reasonable and effective bandwidth speed-limiting method.

SUMMARY

In view of the above, the present disclosure provides a shared bandwidth speed-limiting method, device, and storage medium.

According to one aspect of the present disclosure, there is provided a shared bandwidth speed-limiting method for customer premise equipment (CPE) that is any one of distributed apparatuses, the distributed apparatuses represent at least two pieces of customer premise equipment sharing a same speed-limiting bandwidth and have different network outlets. The method comprises:

adding a token into a token bucket of the customer premise equipment based on an initial bandwidth rate; and sending a statistical information report to a central controller every preset time interval, wherein the statistical information report represents a report reflecting a surplus condition or a deficiency condition of tokens in the token bucket, and the statistical information report is configured to instruct the central controller to reallocate tokens of the customer premise equipment by a central token bucket.

In a possible implementation, the customer premise equipment is provided with a speed-limiting proxy, and sending the statistical information report to the central controller every preset time interval comprises:

obtaining, by the speed-limiting proxy, a token surplus amount which represents the number of tokens that are surplus or deficient in the token bucket; and sending, by the speed-limiting proxy, the statistical information carrying the token surplus amount to the central controller every preset time interval.

In another possible implementation, the method further comprises:

resetting the token bucket based on a statistical information reporting period and a token addition rate if the token surplus amount is positive, wherein the token addition rate is a speed at which a token is added into the token bucket, and the statistical information reporting period is a time period preconfigured by the central controller.

In a possible implementation, if the token surplus amount is negative, the method further comprises:

receiving feedback information from the central controller, wherein the feedback information is configured to indicate bonus additional tokens; and allocating the additional tokens to a designated speed-limiting participating apparatus that is at least one of multiple speed-limiting participating apparatuses connected to the customer premise equipment.

According to another aspect of the present disclosure, there is provided a shared bandwidth speed-limiting method for a central controller. The method comprises:

receiving a statistical information report from a customer premise equipment every present time interval, wherein the statistical information report represents a report reflecting a surplus condition or a deficiency condition of tokens in a token bucket; and reallocating tokens of the customer premise equipment by a central token bucket, wherein the customer premise equipment is any one of distributed apparatuses, the distributed apparatuses represent at least two pieces of customer premise equipment sharing a same speed-limiting bandwidth and have different network outlets.

In a possible implementation, the statistical information report carries a token surplus which represents a number of tokens that are surplus or deficient in the token bucket.

In another possible implementation, the method further comprises:

resetting a maximum surplus value of the central token bucket if the token surplus amount is positive.

In another possible implementation, the method further comprises:

sending feedback information to the customer premise equipment if the token surplus amount is negative, wherein the feedback information is configured to indicate bonus additional tokens.

According to still another aspect of the present disclosure, there is provided a shared bandwidth speed-limiting device for a customer premise equipment, wherein the customer premise equipment is any one of distributed apparatuses, the distributed apparatuses represent at least two pieces of customer premise equipment sharing a same speed-limiting bandwidth and have different network outlets. The device comprises:

a processing module configured to add a token into a token bucket of the customer premise equipment based on an initial bandwidth rate; and a sending module configured to send a statistical information report to a central controller every preset time interval, wherein the statistical information report represents a report reflecting a surplus condition or a deficiency condition of tokens in the token bucket, and is configured to instruct the central control to reallocate tokens of the customer premise equipment by a central token bucket.

In a possible implementation, the customer premise equipment is provided with a speed-limiting proxy, and the sending module is further configured to:

obtain, by the speed-limiting proxy, a token surplus amount which represents a number of tokens that are surplus or deficient in the token bucket; and send, by the speed-limiting proxy, the statistical information report carrying the token surplus to the central controller every the preset time interval.

In another possible implementation, the device further comprises:

the processing module further configured to reset the token bucket based on a statistical information reporting period and a token addition rate if the token surplus amount is positive, wherein the token addition rate is a speed at which a token is added into the token bucket, and the statistical information reporting period is a time period preconfigured by the central controller.

In another possible implementation, if the token surplus amount is negative, the device further comprises a receiving module and a processing module, wherein the receiving module is configured to receive a feedback information from the central controller, the feedback information being configured to indicate bonus additional tokens, and the processing module is further configured to allocate the additional tokens to a designated speed-limiting participating apparatus that is at least one of the multiple speed-limiting participating apparatuses connected to the customer premise equipment.

According still another aspect of the present disclosure, there is provided a shared bandwidth speed-limiting device configured for a central controller. The device comprises:

a receiving module configured to receive a statistical information report sent by a customer premise equipment every preset time interval, wherein the statistical information report represents a report reflecting a surplus condition or a deficiency condition of tokens in the token bucket; and a processing module configured to reallocate tokens of the customer premise equipment by a central token bucket, wherein the customer premise equipment is any one of distributed apparatuses, the distributed apparatuses represent at least two pieces of customer premise equipment sharing a same speed-limiting bandwidth and have different network outlets.

In a possible implementation, the statistical information report includes a token surplus amount which represents a number of tokens that are surplus or deficient in the token bucket.

In another possible implementation, the device further comprises:

the processing module further configured to reset a maximum surplus value of the central token bucket if the token surplus is positive.

In another possible implementation, the device further comprises a sending module, wherein the sending module is configured to send feedback information to the customer premise equipment if the token surplus amount is negative, wherein the feedback information is configured to indicate bonus additional tokens.

According to still another aspect of the present disclosure, there is provided customer premise equipment, the customer premise equipment is any one of distributed apparatuses, the distributed apparatuses represent at least two pieces of customer premise equipment sharing a same speed-limiting bandwidth and have different network outlets. The customer premise equipment comprises a processor; and a memory for storing instructions executable by the processor, wherein the processor is configured to:

add tokens into a token bucket of the customer premise equipment based on an initial bandwidth rate; and send a statistical information report to a central controller every preset time interval, wherein the statistical information report representing a report reflecting a surplus condition or a deficiency condition of tokens in the token bucket, and the statistical information report is configured to instruct the central controller to reallocate tokens of the customer premise equipment by a central token bucket.

According to still another aspect of the present disclosure, there is provided a central controller comprising a processor; and a memory for storing instructions executable by the processor, wherein the processor is configured to receive a statistical information report sent by customer premise equipment every preset time interval, wherein the statistical information report represents a report reflecting a surplus condition or a deficiency condition of tokens in a token bucket; and reallocate tokens of the customer premise equipment by a central token bucket based on the statistical information report, wherein the customer premise equipment is any one of distributed apparatuses, the distributed apparatuses represent at least two pieces of customer premise equipment sharing a same speed-limiting bandwidth and have different network outlets.

According to still another aspect of the present disclosure, there is provided a non-volatile computer-readable storage medium storing computer program instructions which, when executed by a processor, implement the methods described above.

In embodiments of the present disclosure, after a token is added into a token bucket of customer premise equipment based on an initial bandwidth rate, a statistical information report reflecting a surplus condition or a deficiency condition of tokens in the token bucket is sent to a central controller every preset time interval, so that the central controller reallocates tokens of the customer premise equipment by a central token bucket, wherein the customer premise equipment may be any one of distributed apparatuses, and the distributed apparatuses represent at least two pieces of customer premise equipment sharing a same speed-limiting bandwidth and have different network outlets. In this way, a token bucket algorithm is introduced into a distributed environment with a central controller, so that the distributed apparatus, i.e. the at least two pieces of customer premise equipment, can share a speed-limiting bandwidth, thereby providing more flexible bandwidth subscription options and further improving the utilization of bandwidth resources.

BRIEF DESCRIPTION OF THE DRAWINGS

The drawings, which are incorporated in and constitute part of the specification, together with the description, illustrate exemplary embodiments, features and aspects of the present disclosure and serve to explain the principles of the present disclosure.

DETAILED DESCRIPTION

Various exemplary embodiments, features, and aspects of the present disclosure will be described in detail with reference to the drawings. The same reference numerals in the drawings represent parts having the same or similar functions. Although various aspects of the embodiments are shown in the drawings, it is unnecessary to proportionally draw the drawings unless otherwise specified.

Herein the term "exemplary" means "an instance or example, or explanatory." An "exemplary" embodiment given herein is not necessarily construed as being superior to or better than other embodiments.

Numerous details are given in the following embodiments for the purpose of better explaining the present disclosure. It should be understood by a person skilled in the art that the present disclosure can still be realized even without some of those details. In some of the embodiments, methods, means, units and circuits that are well known to a person skilled in the art are not described in detail so that the principle of the present disclosure become apparent.

Network service providers (e.g., traditional operators or cloud service providers) may need to limit the bandwidth available to user equipment while providing network services. Traditional firewall equipment can independently make either a speed limit for one Internet Protocol (IP) address or a share speed limit for multiple IP addresses at the same network outlet. However, it is impossible to implement a shared speed limit for IP addresses at different network outlets in different regions. Related technologies have not yet provided a reasonable and effective bandwidth speed-limiting method. This brings a considerable restriction on network models that network service providers can provide. For example, in a field of a Software-Defined Wide Area Network (SD-WAN), many users desire for a uniform subscription for the bandwidth of traffic at which they access foreign websites from anywhere in China for the sake of higher resource utilization. This, however, is impossible for traditional firewall equipment.

Embodiments of the present disclosure provide a shared bandwidth speed-limiting method, device, and storage medium capable of solving the technical problem described above. In embodiments of the present disclosure, after a token is added into a token bucket of customer premise equipment based on an initial bandwidth rate, a statistical information report reflecting a surplus condition or a deficiency condition of tokens in the token bucket is sent to a central controller every preset time interval, so that the central controller reallocates tokens of the customer premise equipment by a central token bucket, wherein the customer premise equipment may be any one of distributed apparatuses, the distributed apparatuses representing at least two pieces of customer premise equipment sharing a same speed-limiting bandwidth and have different network outlets. In this way, a token bucket algorithm is introduced into a distributed environment with a central controller, so that the distributed apparatus, i.e., the at least two pieces of customer premise equipment, can share a speed-limiting bandwidth, thereby providing more flexible bandwidth subscription options and further improving the utilization of bandwidth resources.

Application scenarios involved in the present disclosure are introduced firstly.

Figure 1:
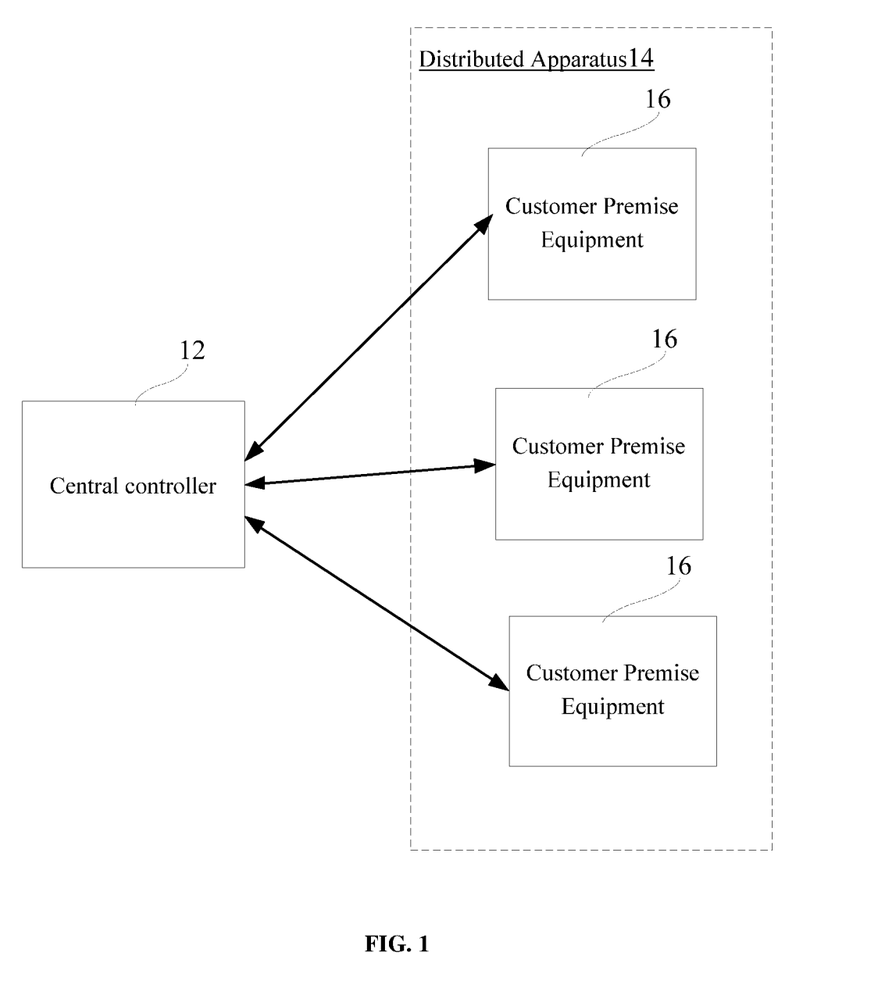
FIG. 1 shows a schematic structural diagram of a shared bandwidth speed-limiting system provided by an exemplary embodiment of the present disclosure.

FIG. 1 shows a schematic structural diagram of a shared bandwidth speed-limiting system provided by an exemplary embodiment of the present disclosure.

The shared bandwidth speed-limiting system comprises a central controller 12 and a distributed apparatus 14. A communication connection is established between the central controller 12 and the distributed apparatus 14. The distributed apparatus 14 represents at least two pieces of customer premise equipment 16 that share the same speed-limiting bandwidth and have different network outlets. That is, the customer premise equipment may be any one of the distributed apparatuses 14. The sum of bandwidth of each of the customer premise equipment 16 sharing the same speed-limited bandwidth is limited by the speed-limiting bandwidth.

The shared bandwidth speed-limiting system is applied to a distributed environment into which a token bucket algorithm is introduced with the central controller 12. Optionally, the central controller 12 may refer to a globally accessible software defined network (SDN) controller. Multiple branches distributed around the world can share the same speed-limiting bandwidth, with each of the branches corresponding to one of the customer premise equipment 16.

Many pieces of Customer premise equipment 16 that share the same speed-limiting bandwidth are distributed in different regions. That is, there is no intersection among regions where the customer premise equipment 16 each are located. It should be noted that FIG. 1 only schematically shows three pieces of customer premise equipment 16, and embodiments of the present disclosure may be not meant to limit the number of the pieces of customer premise equipment 16.

The central controller 12 may maintain a central token bucket configured to maintain a maximum surplus value corresponding to the speed-limiting bandwidth. The maximum surplus value represents the maximum number of tokens that the central token bucket can provide in the case of the limitation of the speed-limiting bandwidth.

Each of multiple branches that share the same speed-limiting bandwidth corresponds to one of the pieces of customer premise equipment 16. The customer premise equipment 16 corresponding to one of the branches may refer to the gateway or outlet routing apparatus of the branch, and the customer premise equipment 16 may be connected with speed-limiting participating apparatuses of the branch. The speed-limiting participating apparatuses may be terminal apparatuses, such as, mobile phones or personal computers.

The speed-limiting participating apparatuses of the branch can be connected to the customer premise equipment 16 via a wireless connection (such as Wi-Fi) or a wired connection, or can be aggregated onto the customer premise equipment 16 via an apparatus such as a switch and a router. Embodiments of the present disclosure are not meant to limit thereto.

For any of the branches, its customer premise equipment 16 acquires an initial bandwidth rate for adding a token into a token bucket of the customer premise equipment 16 based on the initial bandwidth rate, and then sends a statistical information report to the central controller 12 every preset time interval, wherein the statistical information report is configured to indicate a surplus condition or a deficiency condition of tokens in the token bucket of the customer premise equipment 16. The central controller 12 maintains the central token bucket, which is configured to store whole network tokens that correspond to the speed-limiting bandwidth. The number of the whole network tokens may be the maximum surplus value. The central controller 12 reallocates the tokens of the customer premise equipment 16 with the central token bucket.

Optionally, the central controller 12 sends a bandwidth configuration message to an agent program on the customer premise equipment 16 by means of a message queue, wherein the agent program is configured to manage the configuration and report data. After receiving the bandwidth configuration message, the agent program calls a speed-limiting management module in a datapath assembly to issue and enable the configuration.

The bandwidth rate herein refers to the maximum rate of the speed-limiting bandwidth. The initial bandwidth rate can be determined as required in a proper way. For example, the central controller 12 can allocate an initial bandwidth rate for each of the multiple pieces of customer premise equipment 16 equally or proportionally according to the speed-limiting bandwidth and the number of the pieces of customer premise equipment 16.

The algorithm described above can also supports burst traffic of the apparatus, and can still ensures that basic functions of a network are normal even when the controller malfunctions.

The shared bandwidth speed-limiting method provided by embodiments of the present disclosure is illustrated below through several exemplary embodiments.

Figure 2:
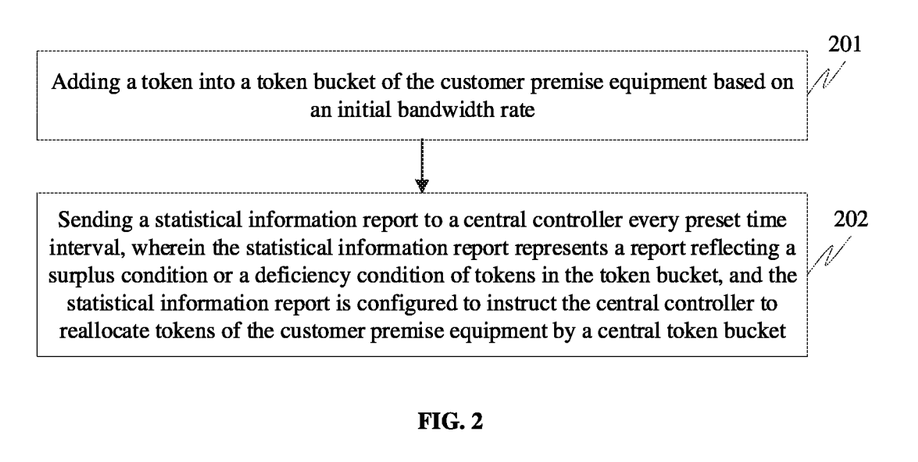
FIG. 2 shows a flowchart of a shared bandwidth speed-limiting method provided by an exemplary embodiment of the present disclosure.

FIG. 2 shows a flowchart of a shared bandwidth speed-limiting method provided by an exemplary embodiment of the present disclosure. A case where the method is applied to the shared bandwidth speed-limiting system shown in FIG. 1 is illustrated as an example in the exemplary embodiment. The method comprises the following steps.

In step 201, adding a token into a token bucket of customer premise equipment based on an initial bandwidth rate.

The customer premise equipment adds a token into its token bucket based on the initial bandwidth rate. The customer premise equipment is any of at least two pieces of customer premise equipment included in a distributed apparatus that share the same throttled bandwidth and have different network outlets. According to the related technologies, the number of tokens can be determined based on the initial bandwidth rate.

In step 202, sending a statistical information report to a central controller every preset time interval, wherein the statistical information report may be a report reflecting a surplus condition or a deficiency condition of tokens in the token bucket, and be configured to instruct the central controller to reallocate tokens of the customer premise equipment with a central token bucket.

In view of thousands of pieces of customer premise equipment, it is relatively important for a high scalability to reduce the communication frequency between customer premise equipment and the central controller. In embodiments of the present disclosure, the customer premise equipment sends a statistical information report to the central controller every preset time interval.

Optionally, customer premise equipment may send a statistical information report to a center controller every preset time interval via a dedicated message channel between the customer premise equipment and the central controller.

The preset time interval may be customized or set by default. This embodiment is not meant to limit thereto. For example, the preset time interval may be set as 10 seconds by default.

The central controller may receive the statistical information report from the customer premise equipment, and reallocate the tokens of the customer premise equipment with the central token bucket based on the statistical information report.

Optionally, the central controller may reallocate the tokens of the customer premise equipment with the central token bucket based on a token allocation strategy.

In order to maximize the bandwidth usage of customers and share the subscribed speed-limiting bandwidth among sites/the pieces of customer premise equipment, the token allocation strategy may be configured to instruct the central controller to allocate surplus bandwidth to customer premise equipment requiring more traffic.

Optionally, the token allocation strategy may be set by default or customized by the user. Illustratively, the central controller may receive a preset token allocation strategy that includes a strategy specifying the sharing of the same speed limit, and/or that is configured to indicate a ratio, to the maximum surplus value, of additional tokens reallocated to each of multiple pieces of customer premise equipment. This embodiment is not meant to limit thereto.

It should be noted that the shared bandwidth speed-limiting method provided by embodiments of the present disclosure can make not only a speed limit for a source IP address, but also a speed limit for complex five-tuple service traffic. Embodiments of the present disclosure are not meant to limit thereto.

To sum up, customer premise equipment may send a statistical information report to a central controller every preset time interval after the bandwidth is initialized in embodiments of the present disclosure. The statistical information report may be configured to indicate a surplus condition or a deficiency condition of tokens in the token bucket of the customer premise equipment, so that the central controller determines and reallocates tokens based on the central token pool. The customer premise equipment is any one of distributed apparatuses representing at least two pieces of customer premise equipment that share the same speed-limiting bandwidth and have different network outlets. In this way, a token bucket algorithm is introduced into a distributed environment with the central controller, so that at least two pieces of customer premise equipment included in the distributed apparatus can share a speed-limiting bandwidth, thereby providing more flexible bandwidth subscription options and further improving the utilization of bandwidth resources.

In addition, if multiple apparatuses may share a speed limiting bandwidth, the controller can usually reallocate fixed bandwidths allocated to the multiple apparatuses according to their traffic usage for a preset period (e.g., 60 seconds). However, multiple apparatuses sharing a speed-limiting bandwidth may have asynchronized clocks, and thus the points of time reported to the controller are different from each other. If the controller makes a reallocation decision every preset period (e.g., 60 seconds), there will be the case that some of the apparatuses have just done the reporting, while some others have already done the reporting 50 seconds ago, which may fail to reflect real-time changes of the respective apparatuses to result in the inconsistency between how much the apparatuses are actually using the traffic and how much they use the traffic at the time of the reporting, thereby further causing inaccurate reallocation of the bandwidth by the controller. For example, two apparatuses may share a speed-limiting bandwidth, and the initial bandwidth of either of the apparatuses may be 10 Mb. the controller reallocates the bandwidth to the apparatuses according to how much they use the traffic after 60 seconds since the apparatuses report how much they use the traffic to the controller, for example, reallocating a bandwidth of 2 Mb to one of them, and a bandwidth of 8 Mb to the other. The two apparatuses make a speed limit based on the reallocated bandwidth.

In embodiments of the present disclosure, any of multiple pieces of customer premise equipment sharing the same speed-limiting bandwidth may add a token into a token bucket of the customer premise equipment based on an initial bandwidth rate, and sends its own requirements, such as a statistical information report indicating that tokens in the toner bucket are surplus or deficient, to a central controller every preset time interval. The central controller dynamically reallocates tokens with a central token bucket. The central controller may support a function of reallocating the tokens, thereby performing a more accurate control of the bandwidth. For instance, two pieces of customer premise equipment have an initial bandwidth of 5 Mb/s. After they synchronize the number of tokens that are surplus or deficient with the central controller, the central controller determines and reallocates the tokens based on the central token bucket, thereby dynamically allocating tokens to pieces of customer premise equipment sharing the bandwidth, and ensuring accurate reallocation of the token.

Figure 3:
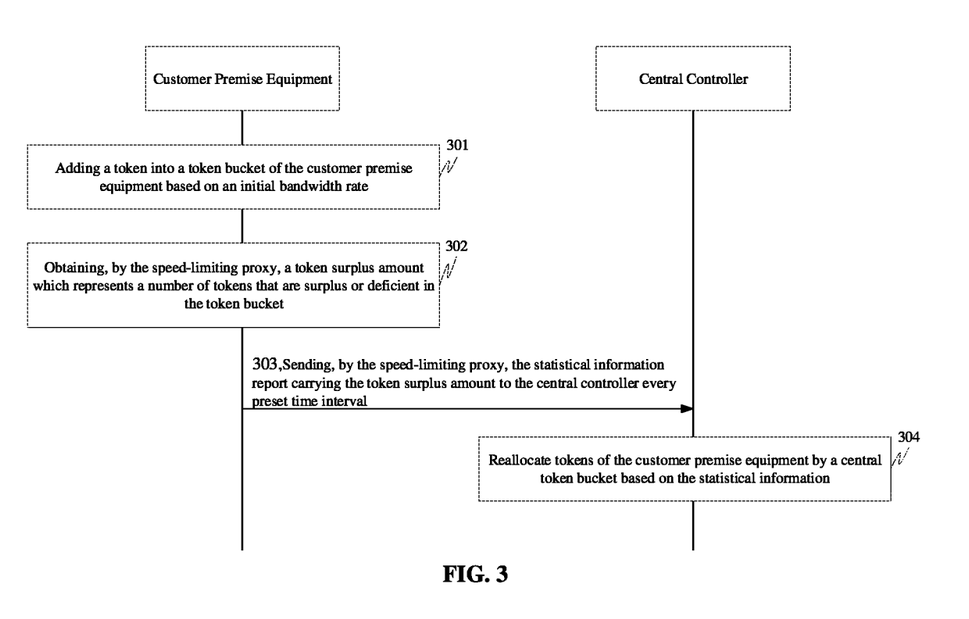
FIG. 3 shows a flowchart of a shared bandwidth speed-limiting method provided by another exemplary embodiment of the present disclosure.

FIG. 3 shows a flowchart of a shared bandwidth speed-limiting method provided by another exemplary embodiment of the present disclosure. A case where the method is applied to the shared bandwidth speed-limiting system shown in FIG. 1 is illustrated as an example in the exemplary embodiment. The method comprises the following steps.

In step 301, adding, by customer premise equipment, a token into a token bucket of the customer premise equipment based on an initial bandwidth.

The customer premise equipment is any of at least two pieces of customer premise equipment included in a distributed apparatuses that share the same speed-limiting bandwidth and have different network outlets.

It should be noted that, the process of adding, by customer premise equipment, a token into the token bucket of the customer premise equipment based on an initial bandwidth, reference may be made with reference to the relevant description in the embodiment described above, which is not repeated herein.

In step 302, determining, by the customer premise equipment with a speed-limiting proxy, a token surplus amount which represents the number of tokens that are surplus or deficient in the token bucket.

The customer premise equipment may be provided with a speed-limiting proxy configured to process token reallocation to each speed-limiting participating apparatus connected to the customer premise equipment.

The customer premise equipment may determine the token surplus amount based on a preset token bucket algorithm with the speed-limiting proxy.

The token surplus amount may represent the number of tokens that are surplus or deficient in the token bucket. The token surplus amount may be positive, zero, or negative. A positive token surplus amount may indicate that the tokens are surplus in the token bucket, and the number of surplus tokens is the token surplus amount. A negative token surplus amount may indicate that the tokens are deficient in the token bucket, and the number of deficient tokens is the absolute value of the token surplus amount.

Optionally, the customer premise equipment may determine a token smoothing rate and the token surplus amount with the speed-limiting proxy. The token smoothing rate is a rate determined based on a historical smoothing rate and a current traffic rate. The historical smoothing rate may be a token smoothing rate determined in a previous determination period. For example, the token smoothing rate may be the sum of ¾ of the historical smoothing rate and ¼ of the current traffic rate.

Optionally, the token bucket of the customer premise equipment may include n token buckets, wherein n is a positive integer. The customer premise equipment may calculate token surplus amount corresponding to each of the n token buckets with the speed-limiting proxy.

In step 303, sending, by the customer premise equipment, a statistical information report carrying the token surplus amount to a central controller with the speed-limiting proxy every preset time interval.

Optionally, the customer premise equipment may send the statistical information report to the central controller with the speed-limiting proxy every the preset time interval, wherein the statistical information report may include token surplus amount corresponding to each of the n token buckets. For description convenience, the case where the customer premise equipment has only one token bucket may be illustrated below as an example.

Optionally, the statistical information report may include a token smoothing rate and the token surplus amount. The statistical information report is configured to instruct the central controller to reallocate tokens of the customer premise equipment with a central token bucket.

Optionally, when the customer premise equipment sends the statistical information report to the central controller, each speed-limiting participating apparatus updates a token smoothing rate corresponding to the speed-limiting participating apparatus.

The central controller may be connected to multiple speed-limiting participating apparatuses via the customer premise equipment. Optionally, the method may further comprise a step of resetting, by the customer premise equipment, the token bucket based on a statistical information reporting period and a token addition rate if the token surplus amount is positive, wherein the token addition rate is a speed at which a token is added into the token bucket and the statistical information reporting period is a time period preconfigured by the central controller.

The central controller may preconfigure a statistical information reporting period and send the preconfigured statistical information reporting period to the customer premise equipment. The customer premise equipment may receive and store the statistical information reporting period.

While the customer premise equipment is sending the statistical information report to the central controller, the speed-limiting proxy of the customer premise equipment traverses all speed-limiting participating apparatuses connected to the customer premise equipment and perform the following operations for each of the speed-limiting participating apparatuses (1) triggering the determination of the token smoothing rate and the token surplus amount designated above and sending the statistical information report carrying the token smoothing rate and the token surplus amount to the central controller; and (2) resetting the token bucket based on the statistical information reporting period and the token addition rate if the token surplus amount is positive. The purpose of doing so is to provide the token surplus amount to the central controller so as to reallocate tokens. Each of the pieces of customer premise equipment may have its own statistical information reporting period and token addition rate, wherein the token addition rate may be preset as required. Customer premise equipment may have the same or different statistical information reporting period and token addition rate.

Illustratively, the customer premise equipment may have two token buckets, one of which is a Transmission Control Protocol (TCP) bucket, and the other is a non-TCP bucket. The TCP bucket is configured to maintain tokens corresponding to service traffic of a TCP protocol, and the non-TCP bucket is configured to maintain tokens corresponding to traffic other than TCP service traffic. The two buckets equally share tokens for the speed-limiting bandwidth. If the number of tokens in the first token bucket of the two token buckets is greater than BucketFullTime*BucketRate/2, and the number of tokens in the second token bucket is less than BucketFullTime*BucketRate/2, then the second token bucket is filled with tokens surplus in the first token bucket, wherein the first token bucket is one of the TCP bucket and the non-TCP bucket, and the second token bucket is the other of the TCP bucket and the non-TCP bucket, and wherein the BucketFullTime represents the statistical information reporting period, and the BucketRate represents the token addition rate.

For example, based on the configuration described above, if the token surplus amount BucketSurplus is positive, the number of tokens in the token bucket is reset as BucketFullTime*BucketRate/2.

In step 304, reallocating, by the central controller, tokens of the customer premise equipment with a central token bucket based on the statistical information report.

The central controller may receive the statistical information report from the customer premise equipment every preset time interval, and reallocate the tokens of the customer premise equipment with a central token bucket based on the statistical information report.

The central token bucket may be configured to store whole network tokens corresponding to the shared speed-limiting bandwidth, and the statistical information report may include the token smoothing rate and the token surplus amount.

The central controller may be provided with a speed-limiting management module configured to maintain additional tokens, i.e. the maximum surplus value, for the respective pieces of customer premise equipment sharing the speed-limiting bandwidth.

Illustratively, the maximum surplus value may be determined based on the statistical information reporting period and the speed-limiting bandwidth. For example, if the statistical information reporting period may be BucketFullTime and the speed-limiting bandwidth may be Rate-Limit-Bandwidth, the maximum surplus value may be 2*BucketFullTime*Rate-Limit-B andwidth.

The central controller may reallocate the tokens of the customer premise equipment with the central token bucket based on the token surplus amount carried in the statistical information report.

Optionally, if the token surplus amount is positive, the central controller resets the maximum surplus value of the central token bucket. Illustratively, the reset maximum surplus value is the minimum of a first surplus value and a second surplus value, wherein the first surplus value is determined based on the statistical information reporting period and the speed-limiting bandwidth, and the second surplus value is determined based on the pre-resetting maximum surplus value and the token surplus amount. For example, if the statistical information reporting period is BucketFullTime, the speed-limiting bandwidth is Rate-Limit-Bandwidth, and the token surplus amount is BucketSurplus, the reset maximum surplus value is TotalSurplus=MIN(2*BucketFullTime*Rate-Limit-Bandwidth, TotalSurplus+BucketSurplus). Embodiments of the present disclosure are not meant to limit thereto. The statistical information report period corresponds to the customer premise equipment sending the statistical information report, and is a time period preconfigured by the central controller and sent to the customer premise equipment.

Optionally, if the token surplus amount is negative, the central controller sends feedback information to the customer premise equipment, wherein the feedback information is configured to indicate bonus additional tokens.

Illustratively, based on the configuration described above, the customer premise equipment may have two token buckets, one of which is a TCP bucket and the other is a non-TCP bucket. If the token surplus amount is negative for the non-TCP bucket, the customer premise equipment discards non-TCP messages. If the token surplus amount is negative and greater than a pre-configured threshold for the TCP bucket, the customer premise equipment sends a designated message for instructing a reduction of the speed at which a sender sends TCP messages. For example, the designated message is a zero window message.

Optionally, if the token surplus amount is negative, the central controller determines a token bonus value, and sends feedback information including the token bonus value to the customer premise equipment. The token bonus value may represent the number of additional tokens allocated by the central controller to the customer premise equipment. Illustratively, the token bonus value is determined based on at least one of the statistical information reporting period, the speed-limiting bandwidth, the maximum surplus value, or the token addition rate. For example, if the statistical information reporting period is BucketFullTime, the speed-limiting bandwidth is Rate-Limit-Bandwidth, the maximum surplus value is TotalSurplus, and the token addition rate is BucketRate, then the token bonus value is TokenBonus=MIN (TotalSurplus, BucketFullTime Rate-Limit-Bandwidth)*(BucketRate/Rate-Limit-Bandwidth).

Optionally, if the maximum surplus value is greater than the product of the statistical information reporting period and the speed-limiting bandwidth, the token bonus value may be reset. For example, if the maximum surplus value is TotalSurplus, the statistical information reporting period is BucketFullTime, the speed-limiting bandwidth is Rate-Limit-Bandwidth, and the token smoothing rate is BucketSmoothedRate, then the reset token bonus value is TokenBonus+=(TotalSurplus-BucketFullTime*Rate-Limit-Bandwidth)*(BucketSmoothedRate/Rate-Limit-Bandwidth). Embodiments of the present disclosure are not meant to limit thereto.

If the token surplus amount is negative, the customer premise equipment receives the feedback information for indicating bonus additional tokens from the central controller and allocates, with the speed-limiting proxy, the additional tokens provided by the central controller to a designated speed-limiting participating apparatus that is at least one of multiple speed-limiting participating apparatuses connected to the customer premise equipment.

Optionally, the feedback information has the token bonus value, and the customer premise equipment acquires the token bonus value in the feedback information to allocate the additional tokens indicated by the token bonus value to the designated speed-limiting participating apparatus in accordance with a preset allocation measurement.

To sum up, in embodiments of the present disclosure, if the token surplus amount is negative, the central controller sends feedback information for indicating bonus additional tokens to the customer premise equipment. The customer premise equipment receives feedback information from the central controller to allocate the additional tokens to the designated speed-limiting participating apparatus based on the feedback information, so that the central controller can timely response to the statistical information report sent by the customer premise equipment and provide the designated speed-limiting participating apparatus with the additional tokens when the tokens are deficient in the token bucket of the customer premise equipment, thereby further ensuring rationality and effectiveness of token reallocation.

Device embodiments of the present disclosure are illustrated below. Some parts that are not described in detail in the device embodiments may be made with reference to the technical details disclosed in the foregoing method embodiments.

Figure 4:
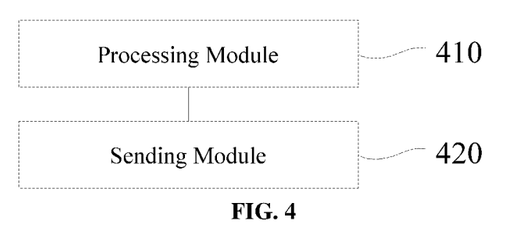
FIG. 4 shows a schematic structural diagram of a shared bandwidth speed-limiting device provided by an exemplary embodiment of the present disclosure.

FIG. 4 shows a schematic structural diagram of a shared bandwidth speed-limiting device provided by an exemplary embodiment of the present disclosure. The shared bandwidth speed-limiting device can be implemented as all or part of customer premise equipment by means of software, hardware, and a combination of both. The customer premise equipment is any of at least two pieces of customer premise equipment included in a distributed apparatus that share the same speed-limited bandwidth and have different network outlets. The device comprises a processing module 410 and a sending module 420.

The processing module 410 is configured to add a token into a token bucket of customer premise equipment based on an initial bandwidth rate.

The sending module 420 is configured to send a statistical information report to a central controller every preset time interval, wherein the statistical information report represents a report reflecting a surplus or deficiency condition of tokens in the token bucket, and is configured to instruct the central control to reallocate tokens of the customer premise equipment by a central token bucket.

In a possible implementation, the customer premise equipment is provided with a speed-limiting proxy, and the sending module 420 is further configured to:

obtain a token surplus amount which represents the number of tokens that are surplus or deficient in the token bucket with the speed-limiting proxy, and send the statistical information report carrying the token surplus amount to the central controller with the speed-limiting proxy every preset time interval.

In another possible implementation, the device further comprises the processing module 410 further configured to reset the token bucket based on a statistical information reporting period and a token addition rate if the token surplus amount is positive, wherein the token addition rate represents a speed at which a token is added into the token bucket, and the statistical information reporting period represents a time period preconfigured by the central controller.

In another possible implementation, if the token surplus amount is negative, the device further comprises:

a receiving module configured to receive feedback information from the control center, wherein the feedback information is configured to indicate bonus additional tokens; and the processing module 410 further configured to allocate the additional tokens to a designated speed-limiting participating apparatus that is at least one of multiple speed-limiting participating apparatuses connected to the customer premise equipment.

It should be noted that the case where various function modules described above are separated while implementing various functions of the device of the embodiments described above are illustrated as an example. In actual applications, the aforementioned functions can be carried out by different function modules according to actual requirements, i.e., an actual structure of the device may be divided into different function modules to implement all or part of the functions described above.

Specific implementations of operation of various modules in the device embodiments described above has been described in detail in the method embodiments, so no detailed descriptions thereof are given herein.

Figure 5:
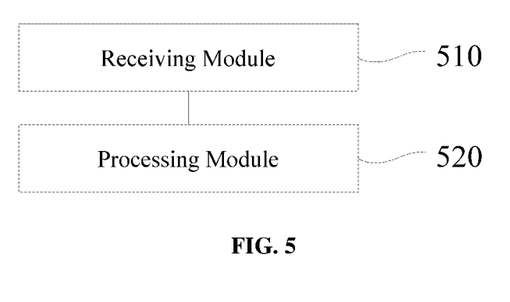
FIG. 5 shows a schematic structural diagram of a shared bandwidth speed-limiting device provided by another exemplary embodiment of the present disclosure.

FIG. 5 shows a schematic structural diagram of a shared bandwidth speed-limiting device provided by another exemplary embodiment of the present disclosure. The shared bandwidth speed-limiting device can be implemented as all or a part of a central controller through software, hardware, and a combination of both. The device comprises a receiving module 510 and a processing module 520.

The receiving module 510 is configured to receive a statistical information report from customer premise equipment every preset time interval, wherein the statistical information report is a report reflecting a surplus condition or a deficiency condition of tokens in the token bucket.

The processing module 520 is configured to reallocate tokens of the customer premise equipment based on the statistical information with a central token bucket.

The customer premise equipment is any of at least two pieces of customer premise equipment included in a distributed apparatuses that share the same speed-limiting bandwidth and have different network outlets.

In a possible implementation, the statistical information report includes a token surplus amount which represents the number of tokens that are surplus or deficient in the token bucket.

In another possible implementation, the device further comprises:

the processing module 520 further configured to reset a maximum surplus value of the central token bucket if the token surplus amount is positive.

In another possible implementation, the device further comprises a sending module.

The sending module is configured to send feedback information to the customer premise equipment if the token surplus amount is negative, wherein the feedback information is configured to indicate bonus additional tokens.

It should be noted that the case where various function modules described above are separated while implementing various functions of the device of the embodiments described above are illustrated as an example. In actual applications, the aforementioned functions can be carried out by different function modules according to actual requirements, i.e., an actual structure of the device may be divided into different function modules to implement all or part of the functions described above.

Specific implementations of operation of various modules in the device embodiments described above has been described in detail in the method embodiments, so no detailed descriptions thereof are given herein.

Embodiments of the present disclosure also provide customer premise equipment that comprises a processor; and a memory for storing instructions executable by the processor, wherein the processor is configured to implement steps performed by the customer premise equipment in the method embodiments described above.

Embodiments of the present disclosure also provide a central controller that comprises a processor; and a memory for storing instructions executable by the processor, wherein the processor is configured to implement steps performed by the central controller in the method embodiments described above.

Embodiments of the present disclosure also provide a shared bandwidth speed-limiting system that comprises a central controller and multiple pieces of customer premise equipment that have communication connections with the central controller. The customer premise equipment includes the device provided in FIG. 4. The central controller includes the device provided in FIG. 5.

Embodiments of the present disclosure also provide a non-volatile computer-readable storage medium storing computer program instructions which, when executed by a processor, implement the methods in the method embodiments described above.

The present disclosure may be implemented by a system, a method, and/or a computer program product. The computer program product may include a computer readable storage medium having computer readable program instructions for causing a processor to carry out the aspects of the present disclosure stored thereon.

The computer readable storage medium can be a tangible apparatus that can retain and store instructions used by an instruction executing apparatus. The computer readable storage medium may be, but not limited to, e.g., electronic storage apparatus, magnetic storage apparatus, optical storage apparatus, electromagnetic storage apparatus, semiconductor storage apparatus, or any proper combination thereof. A non-exhaustive list of more specific examples of the computer readable storage medium includes: portable computer diskette, hard disk, random access memory (RAM), read-only memory (ROM), erasable programmable read-only memory (EPROM or Flash memory), static random access memory (SRAM), portable compact disc read-only memory (CD-ROM), digital versatile disk (DVD), memory stick, floppy disk, mechanically encoded apparatus (for example, punch-cards or raised structures in a groove having instructions recorded thereon), and any proper combination thereof. A computer readable storage medium referred herein should not to be construed as transitory signal per se, such as radio waves or other freely propagating electromagnetic waves, electromagnetic waves propagating through a waveguide or other transmission media (e.g., light pulses passing through a fiber-optic cable), or electrical signal transmitted through a wire.

Computer readable program instructions described herein can be downloaded to individual computing/processing apparatus from a computer readable storage medium or to an external computer or external storage apparatus via network, for example, the Internet, local area network, wide area network and/or wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium in the respective computing/processing apparatuses.

Computer readable program instructions for carrying out the operations of the present disclosure may be assembler instructions, instruction-set-architecture (ISA) instructions, machine instructions, machine-related instructions, microcode, firmware instructions, state-setting data, or source code or object code written in any combination of one or more programming languages, including an object oriented programming language, such as Smalltalk, C++ or the like, and the conventional procedural programming languages, such as the "C" programming language or similar programming languages. The computer readable program instructions may be executed completely on the user's computer, partly on the user's computer, as a stand-alone software package, partly on the user's computer and partly on a remote computer, or completely on a remote computer or a server. In the scenario with remote computer, the remote computer may be connected to the user's computer through any type of network, including local area network (LAN) or wide area network (WAN), or connected to an external computer (for example, through the Internet connection from an Internet Service Provider). In some embodiments, electronic circuitry, such as programmable logic circuitry, field-programmable gate arrays (FPGA), or programmable logic arrays (PLA), may be customized from state information of the computer readable program instructions; the electronic circuitry may execute the computer readable program instructions, so as to achieve the aspects of the present disclosure.

Aspects of the present disclosure have been described herein with reference to the flowchart and/or the block diagrams of the method, device (systems), and computer program product according to the embodiments of the present disclosure. It should be appreciated that each block in the flowchart and/or the block diagram, and combinations of blocks in the flowchart and/or block diagram, can be implemented by the computer readable program instructions.

These computer readable program instructions may be provided to a processor of a general purpose computer, a dedicated computer, or other programmable data processing devices, to produce a machine, such that the instructions create means for implementing the functions/acts specified in one or more blocks in the flowchart and/or block diagram when executed by the processor of the computer or other programmable data processing devices. These computer readable program instructions may also be stored in a computer readable storage medium, wherein the instructions cause a computer, a programmable data processing device and/or other apparatuses to function in a particular manner, such that the computer readable storage medium having instructions stored therein comprises a product that includes instructions implementing aspects of the functions/acts specified in one or more blocks in the flowchart and/or block diagram.

The computer readable program instructions may also be loaded onto a computer, other programmable data processing devices, or other apparatuses to have a series of operational steps performed on the computer, other programmable devices or other apparatuses, so as to produce a computer implemented process, such that the instructions executed on the computer, other programmable devices or other apparatuses implement the functions/acts specified in one or more blocks in the flowchart and/or block diagram.

The flowcharts and block diagrams in the drawings illustrate the architecture, function, and operation that may be implemented by the system, method, and computer program product according to the various embodiments of the present disclosure. In this regard, each block in the flowchart or block diagram may represent a part of a module, a program segment, or a portion of code, which comprises one or more executable instructions for implementing the specified logical function(s). In some alternative implementations, the functions denoted in the blocks may occur in an order different from that denoted in the drawings. For example, two contiguous blocks may, in fact, be executed substantially concurrently, or sometimes they may be executed in a reverse order, depending upon the functions involved. It should also be noted that each block in the block diagram and/or flowchart, and combinations of blocks in the block diagram and/or flowchart, can be implemented by dedicated hardware-based systems performing the specified functions or acts, or by combinations of dedicated hardware and computer instructions.

Although various embodiments of the present disclosure have been described above, it should be appreciated that the above descriptions are merely exemplary, not exhaustive; and that the disclosed embodiments are not limiting. A number of variations and modifications may occur to one skilled in the art without departing from the scopes and spirits of the described embodiments. The terms in the present disclosure are selected to provide the best explanation on the principles and practical applications of the embodiments and the technical improvements to the arts on market, or to make the embodiments described herein understandable to one skilled in the art.

The invention claimed is:

1. A shared bandwidth speed-limiting method for a customer premise equipment, wherein the customer premise equipment being any one of distributed apparatuses, the distributed apparatuses representing at least two pieces of customer premise equipment sharing a same speed-limiting bandwidth and have different network outlets, the method comprising:
adding a token into a token bucket of the customer premise equipment based on an initial bandwidth rate; and
sending a statistical information report to a central controller every preset time interval, wherein the statistical information report represents a report reflecting a surplus condition or a deficiency condition of tokens in the token bucket, and the statistical information report is configured to instruct the central controller to reallocate tokens of the customer premise equipment by a central token bucket,
wherein the customer premise equipment is provided with a speed-limiting proxy, and sending the statistical information report to the central controller every preset time interval comprises:
obtaining, by the speed-limiting proxy, a token surplus amount of the customer premise equipment which represents a number of tokens that are surplus or deficient in the token bucket of the customer premise equipment; and
sending, by the speed-limiting proxy, the statistical information report carrying the token surplus amount to the central controller every the preset time interval,
wherein, if the token surplus amount is negative, the method further comprises:
receiving feedback information from the central controller, wherein the feedback information is configured to indicate bonus additional tokens; and
allocating the additional tokens to a designated speed-limiting participating apparatus that is at least one of multiple speed-limiting participating apparatuses connected to the customer premise equipment.

2. The method according to claim 1, further comprising: resetting the token bucket based on a statistical information reporting period and a token addition rate if the token surplus amount is positive, wherein the token addition rate represents a speed at which a token is added into the token bucket, and the statistical information reporting period represents a time period preconfigured by the central controller.

3. A shared bandwidth speed-limiting method configured for a central controller, the method comprising:
receiving a statistical information report from a customer premise equipment every present time interval, wherein the statistical information report represents a report reflecting a surplus condition or a deficiency condition of tokens in a token bucket; and
reallocating tokens of the customer premise equipment by a central token bucket,
wherein the customer premise equipment being any one of distributed apparatuses, the distributed apparatuses representing at least two pieces of customer premise equipment sharing a same speed-limiting bandwidth and have different network outlets,
wherein receiving the statistical information report from the customer premise equipment every present time interval comprises:
receiving the statistical information report carrying a token surplus amount of the customer premise equipment which represents a number of tokens that are surplus or deficient in the token bucket of the customer premise equipment, the token surplus amount being obtained by a speed-limiting proxy of the customer premise equipment,
wherein the method further comprises:
sending feedback information to the customer premise equipment if the token surplus amount is negative, wherein the feedback information is configured to indicate bonus additional tokens, and
allocating the additional tokens to a designated speed-limiting participating apparatus that is at least one of multiple speed-limiting participating apparatuses connected to the customer premise equipment.

4. The method according to claim 3, further comprising: resetting a maximum surplus value of the central token bucket if the token surplus amount is positive.

5. A customer premise equipment, the customer premise equipment being any one of distributed apparatuses, the distributed apparatuses representing at least two pieces of customer premise equipment sharing a same speed-limiting bandwidth and have different network outlets, the customer premise equipment comprising:
a processor; and
a memory for storing instructions executable by the processor,
wherein the processor is configured to:
add a token into a token bucket of the customer premise equipment based on an initial bandwidth rate; and
send a statistical information report to a central controller every preset time interval, wherein the statistical information report representing a report reflecting a surplus condition or a deficiency condition of tokens in the token bucket, and the statistical information report is configured to instruct the central controller to reallocate tokens of the customer premise equipment by a central token bucket, wherein the processor is further configured to:

obtain a token surplus amount of the customer premise equipment which represents a number of tokens that are surplus or deficient in the token bucket of the customer premise equipment;

send the statistical information report carrying the token surplus amount to the central controller every the preset time interval;

receive feedback information from the central controller if the token surplus amount is negative, wherein the feedback information is configured to indicate bonus additional tokens; and allocate the additional tokens to a designated speed-limiting participating apparatus that is at least one of multiple speed-limiting participating apparatuses connected to the customer premise equipment.

6. A central controller, comprising:
a processor; and
a memory for storing instructions executable by the processor,
wherein the processor is configured to:
receive a statistical information report sent by a customer premise equipment every preset time interval, wherein the statistical information report represents a report reflecting a surplus condition or a deficiency condition of tokens in a token bucket; and
reallocate tokens of the customer premise equipment by a central token bucket based on the statistical information report,
wherein the customer premise equipment being any one of distributed apparatuses, the distributed apparatuses representing at least two customer premise equipment sharing a same speed-limiting bandwidth and have different network outlets,
wherein the processor is further configured to:
receive the statistical information report carrying a token surplus amount of the customer premise equipment which represents a number of tokens that are surplus or deficient in the token bucket of the customer premise equipment, the token surplus amount being obtained by a speed-limiting proxy of the customer premise equipment;
send feedback information from the central controller if the token surplus amount is negative, wherein the feedback information is configured to indicate bonus additional tokens; and
allocate the additional tokens to a designated speed-limiting participating apparatus that is at least one of multiple speed-limiting participating apparatuses connected to the customer premise equipment.

7. A non-volatile computer-readable storage medium storing computer program instructions which, when executed by a processor, causes the processor to:
add a token into a token bucket of the customer premise equipment based on an initial bandwidth rate; and
send a statistical information report to a central controller every preset time interval, wherein the statistical information report representing a report reflecting a surplus condition or a deficiency condition of tokens in the token bucket, and the statistical information report is configured to instruct the central controller to reallocate tokens of the customer premise equipment by a central token bucket;
wherein the processor is further configured to:
obtain a token surplus amount of the customer premise equipment which represents a number of tokens that are surplus or deficient in the token bucket of the customer premise equipment;
send the statistical information report carrying the token surplus amount to the central controller every the preset time interval;
receive feedback information from the central controller if the token surplus amount is negative, wherein the feedback information is configured to indicate bonus additional tokens; and
allocate the additional tokens to a designated speed-limiting participating apparatus that is at least one of multiple speed-limiting participating apparatuses connected to the customer premise equipment.

8. A non-volatile computer-readable storage medium storing computer program instructions which, when executed by a processor, causes the processor to:
receive a statistical information report from a customer premise equipment every present time interval, wherein the statistical information report represents a report reflecting a surplus condition or a deficiency condition of tokens in a token bucket; and
reallocate tokens of the customer premise equipment by a central token bucket,
wherein the customer premise equipment being any one of distributed apparatuses, the distributed apparatuses representing at least two pieces of customer premise equipment sharing a same speed-limiting bandwidth and have different network outlets,
wherein the processor is further configured to:
receive the statistical information report carrying a token surplus amount of the customer premise equipment which represents a number of tokens that are surplus or deficient in the token bucket of the customer premise equipment, the token surplus amount being obtained by a speed-limiting proxy of the customer premise equipment;
send feedback information from the central controller if the token surplus amount is negative, wherein the feedback information is configured to indicate bonus additional tokens; and
allocate the additional tokens to a designated speed-limiting participating apparatus that is at least one of multiple speed-limiting participating apparatuses connected to the customer premise equipment.

\* \* \* \* \*